(12) United States Patent
Aggarwal et al.

(10) Patent No.: US 11,190,653 B2
(45) Date of Patent: Nov. 30, 2021

(54) TECHNIQUES FOR CAPTURING AN IMAGE WITHIN THE CONTEXT OF A DOCUMENT

(71) Applicant: Adobe Inc., San Jose, CA (US)

(72) Inventors: Shilpi Aggarwal, Delhi (IN); Sourabh Goel, Uttar Pradesh (IN); Sunandini Basu, Delhi (IN)

(73) Assignee: ADOBE INC., San Jose, CA (US)

( * ) Notice: Subject to any disclaimer, the term of this patent is extended or adjusted under 35 U.S.C. 154(b) by 473 days.

(21) Appl. No.: 15/219,432

(22) Filed: Jul. 26, 2016

(65) Prior Publication Data
US 2018/0034979 A1    Feb. 1, 2018

(51) Int. Cl.
H04N 1/00 (2006.01)
H04N 5/232 (2006.01)

(52) U.S. Cl.
CPC ....... *H04N 1/0044* (2013.01); *H04N 1/00251* (2013.01); *H04N 1/00392* (2013.01); *H04N 5/23216* (2013.01); *H04N 5/232933* (2018.08)

(58) Field of Classification Search
None
See application file for complete search history.

(56) References Cited

U.S. PATENT DOCUMENTS

| | | | | |
|---|---|---|---|---|
| 5,617,528 A * | 4/1997 | Stechmann | ............ | G06K 1/121 358/540 |
| 6,313,843 B1 * | 11/2001 | Tanii | ..................... | A63F 13/005 345/473 |
| 6,442,573 B1 * | 8/2002 | Schiller | .................... | H04L 29/06 715/210 |
| 6,947,609 B2 * | 9/2005 | Seeger | ............... | G06K 9/00993 358/486 |
| 7,149,366 B1 * | 12/2006 | Sun | ........................... | G01J 3/02 382/284 |
| 8,644,673 B2 * | 2/2014 | Martin | ............. | H04N 21/47202 345/629 |
| 8,644,702 B1 * | 2/2014 | Kalajan | ............ | H04N 21/64784 396/429 |
| 8,934,044 B2 * | 1/2015 | Dowd | ..................... | H04N 5/232 348/222.1 |
| 9,747,622 B1 * | 8/2017 | Johnson | ............. | G06Q 30/0601 |
| 2002/0003531 A1 * | 1/2002 | Kim | ........................ | F25D 29/00 345/173 |
| 2003/0231178 A1 * | 12/2003 | Lee | ...................... | G01S 15/8993 345/419 |

(Continued)

*Primary Examiner* — Anh-Vinh T Nguyen
(74) *Attorney, Agent, or Firm* — Kilpatrick Townsend & Stockton LLP

(57) ABSTRACT

Disclosed are various embodiments for capturing an image within the context of a document. The computing device identifies an image field within the document displayed in a user interface (UI). The image field is operable to display live input received from a camera. In response to receiving a first input from a user selecting the image field of the document, the UI of the computing device displays the live input from the camera within the image field of the document in the context of other portions of the document displayed outside of the image field. Controls are provided by the computing device with which the user can adjust various characteristics of the live input. In response to receiving a second input from the user, the computing device captures the image from the live input displayed within the image field of the document.

20 Claims, 9 Drawing Sheets

(56) References Cited

U.S. PATENT DOCUMENTS

| | | | |
|---|---|---|---|
| 2006/0238617 A1* | 10/2006 | Tamir | G08B 13/19606 348/143 |
| 2007/0025723 A1* | 2/2007 | Baudisch | G03B 13/02 396/287 |
| 2009/0174656 A1* | 7/2009 | Voss | A63F 13/00 345/157 |
| 2009/0278974 A1* | 11/2009 | Kuwahara | G03B 29/00 348/333.06 |
| 2010/0273526 A1* | 10/2010 | Rajan | H04W 4/00 455/557 |
| 2011/0141141 A1* | 6/2011 | Kankainen | G01C 21/3647 345/632 |
| 2011/0149111 A1* | 6/2011 | Prentice | H04N 5/23216 348/229.1 |
| 2011/0292076 A1* | 12/2011 | Wither | G06F 17/30265 345/632 |
| 2012/0094737 A1* | 4/2012 | Barclay | G07F 17/3213 463/20 |
| 2012/0105681 A1* | 5/2012 | Morales | G06T 5/50 348/239 |
| 2012/0120110 A1* | 5/2012 | Chae | G06F 3/0484 345/660 |
| 2012/0288264 A1* | 11/2012 | Aoyama | H04N 5/232933 396/121 |
| 2013/0088615 A1* | 4/2013 | Altieri | H04N 5/225 348/231.3 |
| 2013/0124961 A1* | 5/2013 | Linburn | G06F 17/243 715/224 |
| 2013/0335333 A1* | 12/2013 | Kukulski | G06F 3/04845 345/173 |
| 2013/0335419 A1* | 12/2013 | Bondesen | G06T 11/206 345/440 |
| 2014/0210714 A1* | 7/2014 | Kang | G06F 3/033 345/158 |
| 2014/0330729 A1* | 11/2014 | Colangelo | G06Q 20/40145 705/72 |
| 2014/0375861 A1* | 12/2014 | Jang | H04N 5/2353 348/333.01 |
| 2015/0035959 A1* | 2/2015 | Amble | A61B 8/565 348/74 |
| 2015/0262412 A1* | 9/2015 | Gruber | G06T 19/006 345/426 |
| 2016/0081650 A1* | 3/2016 | Okusu | A61B 6/56 378/62 |
| 2016/0210602 A1* | 7/2016 | Siddique | G06Q 20/0453 |
| 2017/0061438 A1* | 3/2017 | Patel | G06K 9/00442 |
| 2017/0085733 A1* | 3/2017 | Ilic | G06T 19/20 |
| 2017/0187946 A1* | 6/2017 | Kozakura | H04N 5/23203 |
| 2018/0025251 A1* | 1/2018 | Welinder | G06T 7/194 382/199 |
| 2018/0046818 A1* | 2/2018 | Amacker | G06F 21/6218 |
| 2018/0130257 A1* | 5/2018 | Moran | H04N 5/77 |
| 2018/0220077 A1* | 8/2018 | Okubo | H04N 5/2628 |
| 2021/0044758 A1* | 2/2021 | Watanabe | H04N 5/232933 |

* cited by examiner

TECHNIQUES FOR CAPTURING AN IMAGE WITHIN THE CONTEXT OF A DOCUMENT

BACKGROUND

Users commonly interact with digital documents on various computing devices, such as mobile phones, tablets, laptops, etc. Some of these documents need to have an image inserted into the document, such as a photograph to be included with a form. Typically the users will capture an image using a camera in the device, store the image, crop and scale the captured image, then insert the image in the document only to find that more adjustments are necessary when the image is viewed within the context of the document. What is needed is a way to simplify the process for capturing an image to be placed within a document by allowing the user to view the image in the context of the document prior to capture.

SUMMARY

Various aspects of the present invention relate to a computing device capturing an image within the context of a document. To this end, the computing device identifies an image field within the document displayed in a user interface. The image field is operable to display live input received from a camera accessible by the computing device. In response to receiving a first input from a user selecting the image field of the document, the live input from the camera is displayed within the image field of the document in the context of other portions of the document displayed outside of the image field. Controls are provided by the computing device with which the user can adjust various characteristics of the live input from the camera displayed within the document. The controls may include interfaces allowing a user to: adjust scaling of the live input from the camera displayed within the document, adjust lighting used, specify whether video or at least one still image should be captured, select a different camera, adjust a size of the image field, and/or make other types of adjustments to image characteristics. In response to receiving a second input from the user, the camera of the computing device captures the image from the live input displayed within the image field of the document. The image may be one or more still images or videos, and may be accompanied by audio. Thereafter, the image is stored as a component part of the document.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
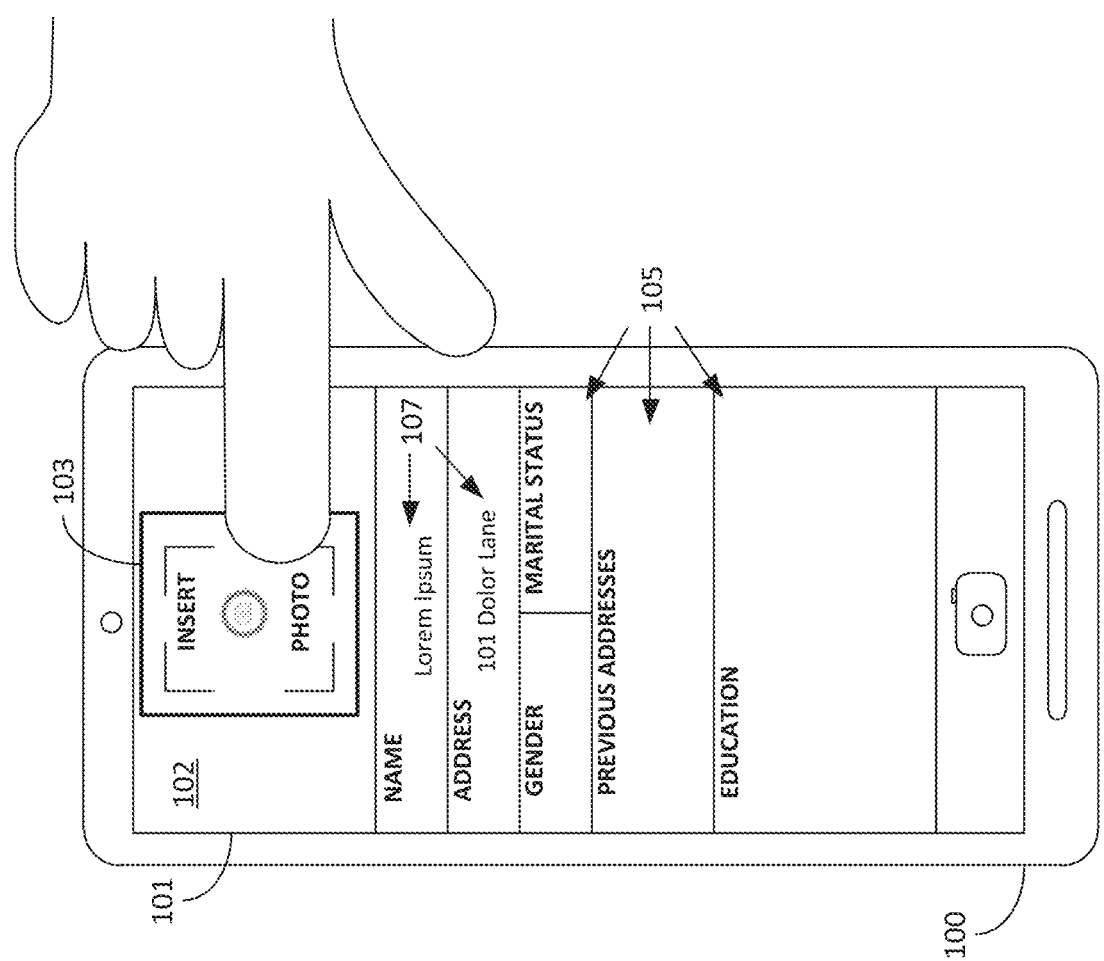

Disclosed herein are various embodiments of a system and method for capturing an image within the context of a document. As shown in the exemplary illustration of FIG. 1, a mobile device 100 uses a touch-sensitive display 101 to present a document 102 that includes an image field 103 along with various other fields 105 for entry of text strings 107. Using the mobile device 100, a user can edit the text of the document 102, as well as initiate insertion of an image into the document by selecting the image field 103.

Figure 2:
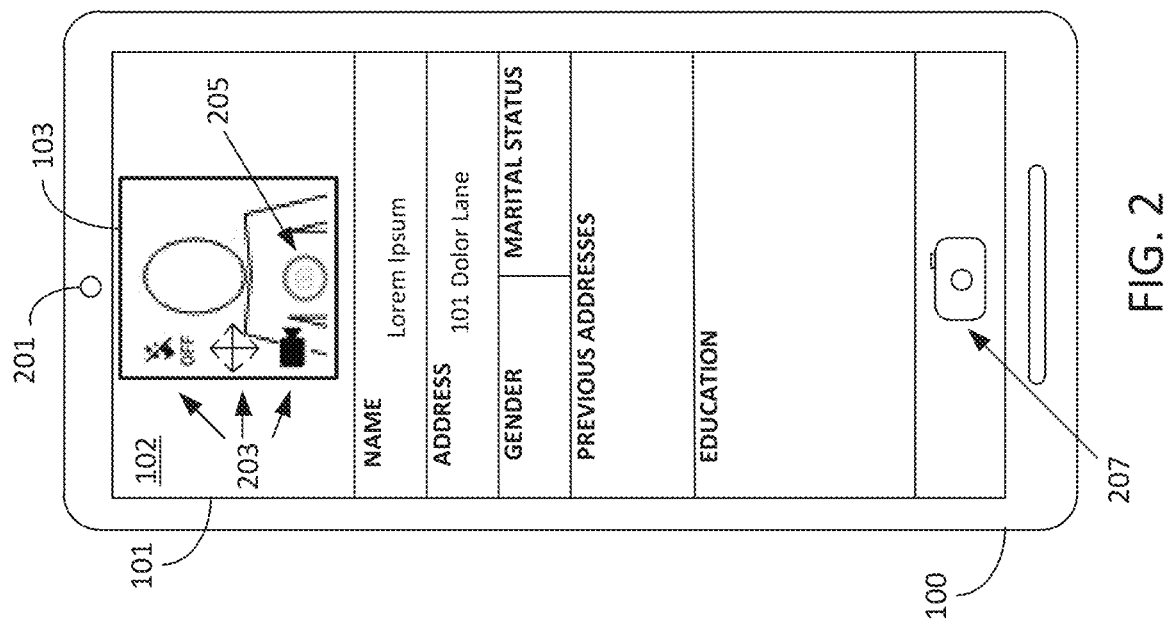
FIGS. 1-2 are diagrams of an example user interface rendered by a client according to various embodiments of the present disclosure.

Once selected, as shown in FIG. 2, the image field 103 begins displaying, within the context of the document 102, a live input from a camera (e.g., camera 201) connected to or accessible by the mobile device 100. With the live input presented in the image field 103 of the document 102, a user can evaluate how an image will look when captured within the context of the document 102. Various controls 203 may also be displayed to allow the user to adjust the camera settings for capturing the image as may be needed to optimize the appearance of the image when viewed within the context of the document 102. For example, the controls 203 can include an option for the user to adjust the scaling of the image (i.e., the "zoom"), the dimensions of the image, whether flash or supplementary lighting is used, switch between capturing a still image or video, etc.

When satisfied with the appearance of the live input shown within the image field of the document 102, the user can provide input to the mobile device 100, such as by selecting the camera icon 205, to cause the camera to capture an image from the live input and display it within the image field 103 of the document 102. In some implementations, other input devices may be used instead of or in addition to the camera icon 205 for initiating capture of the image, such as a tactile button 207, a tap or other input received anywhere within the image field 103, etc. Thereafter, the captured image is stored as a component part of the document 102 such that subsequent viewings of the document 102 on the mobile device 100 and/or on other computing devices will present the document 102 with the captured image in the image field 103. Among other improvements, an image captured in this manner often does not need a user to open a second application (i.e., image editing application) to perform post-capture processing, such as cropping or scaling, as the user is able to evaluate, prior to capture, the appearance of the image within the context of the document, where the target image field 103 is presented with other document content being visible. As such, the invention provides an improvement over existing document creation and/or editing applications by allowing seamless interaction with a camera for image capture and by providing local (in-application) image editing functions. This provides not only improved usability and convenience for the user, but also can reduce consumption of computing resources, such as memory space, processor usage and/or network bandwidth. In the following discussion, a general description of the system and its components is provided, followed by a discussion of the operation of the same.

As used herein, an "image," such as in the phrase "capturing an image," corresponds to one or more still images or videos that, when viewed, provide a visual presentation. Thus for simplicity, references to, for example, "capturing an image" refer to capturing one or more still images or videos.

Figure 3:
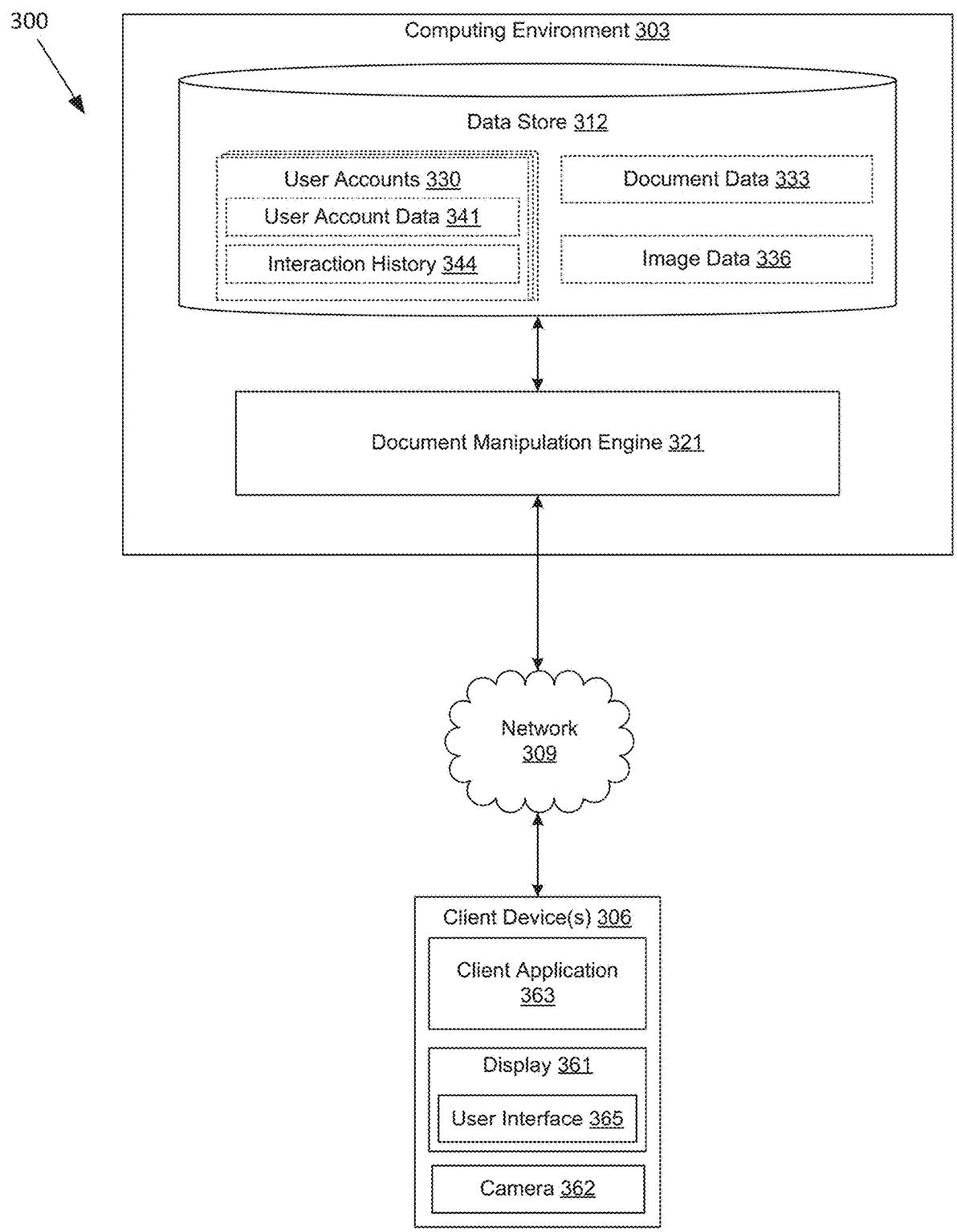
FIG. 3 is a diagram of a networked environment according to various embodiments of the present disclosure.

With reference to FIG. 3, shown is a networked environment 300 according to various embodiments. The networked environment 300 includes a computing environment 303 and a client device 306, which are in data communication with each other via a network 309. The network 309 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 300, other implementations are possible, such as implementing the functionality in a single computing device (e.g. desktop computer or mobile device), as a plug-in or auxiliary feature of another service executed in a computing device, and/or in arrangements of computing devices other than those shown in FIG. 3.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a document manipulation engine 321, and other applications, services, processes, systems, engines, or functionality not discussed in detail herein. As discussed in detail herein, the document manipulation engine 321 is executed to facilitate a user capturing one or more images (e.g., still image or video) within a displayed document by first displaying live input from a camera in the context of the displayed document. Once the user has viewed the live input from the camera within the context of the document and made any desired adjustments to the live input, the user may then capture the one or more images in the document.

The data stored in the data store 312 includes, for example, user accounts 330, document data 333, image data 336, and potentially other data. The document data 333 includes data and metadata stored for various documents in different possible document formats, such as Portable Document Format (PDF), eXtensible Markup Language (XML), Microsoft® Word®, and/or other possible document formats as can be appreciated. The document data 333 can also include various attributes and permissions related to user accounts 330 for creating, accessing, modifying, and/or deleting documents. In addition, the document data 333 can include storing one or more versions of a document, such as one version stored before a modification, and a second version of the document stored after the modification. The image data 336 includes data and metadata that may be stored for various images in different possible document formats, such as Joint Photographic Expert Group (JPEG), Portable Network Graphics (PNG), Graphics Interchange Format (GIF), and/or other possible image formats as can be appreciated. The metadata can include size of the image, resolution, geographic location ("geolocation"), camera settings used to capture the image, and/or other possible information. The image data 336 can also include various attributes and permissions related to user accounts 330 for creating, accessing, modifying, and/or deleting images. In some implementations, the documents and/or images stored in the data store 312 may be stored as files.

The individual user accounts 330 may include user account data 341, interaction history 344, and other possible data. The user account data 341 can include user identifiers, user group identifiers, credentials, permissions, associated client devices 306, etc. The interaction history 344 includes a log of the various documents modified by a user, identifiers and/or metadata for images captured in the respective documents, whether the image was re-used in other locations in the same document and/or different documents, and possibly other information.

The client 306 is representative of various possible client devices that may be coupled to the network 309. The client 306 may comprise, for example, a processor-based system such as a computer system. Such a computer system may be embodied in the form of a tablet computer, a smartphone, a desktop computer, a laptop computer, a cellular telephone, a set-top box, or other devices with like capability. The client 306 may include connectivity to a display 361 and camera 362. The display 361 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some implementations, the display 361 is touch-sensitive. The camera 362 may include a Complementary Metal-Oxide-Semiconductor (CMOS) sensor, Charge Coupled Device (CCD) sensor, and/or other type of image sensor as can be appreciated.

The client 306 may be configured to execute various applications such as a client application 363 and/or other applications. The client application 363 may be executed in the client 306, for example, to access network content served up by the computing environment 303 and/or other servers, thereby rendering a user interface 365, such as a Graphical User Interface (GUI), on the display 361, which can display live input from the camera 362. To this end, the client application 363 may comprise, for example, a browser, a dedicated application, etc., and the user interface 365 may comprise a network page, an application screen, etc. The client 306 may be configured to execute applications beyond the client application 363 such as, for example, email applications, social networking applications, word processors, spreadsheets, and/or other applications.

Next, a general description of the operation of the various components of the networked environment 300 is provided. To begin, a user operating the client 306 employs the client application 363 to establish a communication session with the document manipulation engine 321. The communication session may be carried out using various protocols such as, for example, HyperText Transfer Protocol (HTTP), Simple Object Access Protocol (SOAP), REpresentational State Transfer (REST), User Datagram Protocol (UDP), Transmission Control Protocol (TCP), and/or other protocols for communicating data over the network 309. In some implementations, the user is authenticated to the document manipulation engine 321 using one or more user credentials.

Figure 4:
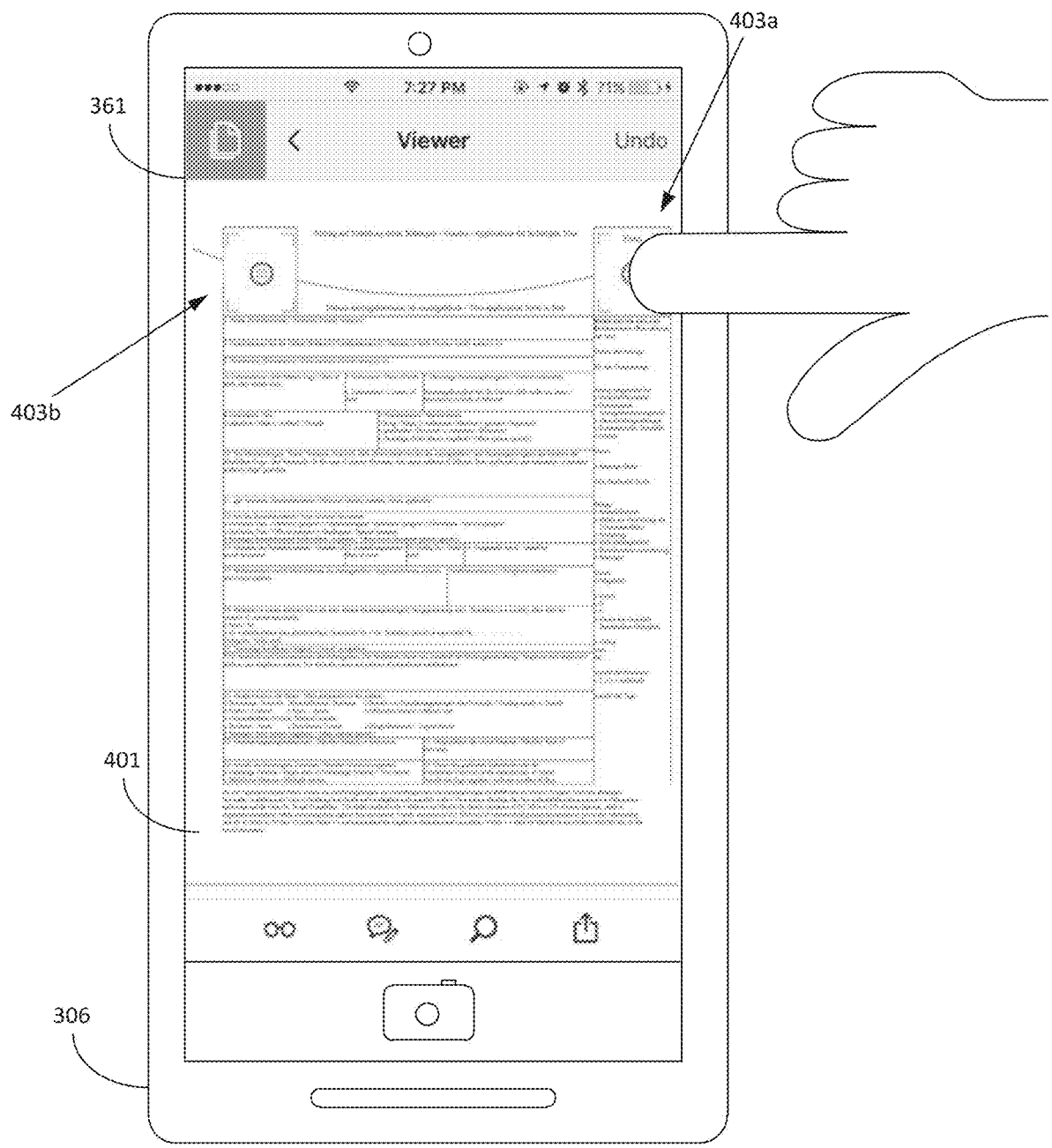
FIGS. 4-8 are diagrams of another example user interface rendered by a client in the networked environment of FIG. 3 according to various embodiments of the present disclosure.

Thereafter, the user selects, from the user interface 365, a document into which one or more images (e.g., one or more still images or video) are to be inserted. As illustrated in FIG. 4, the document 401 is presented on the touch-sensitive display 361 of the client device 306. Included within the context of various text strings and fields for text entry in the document 401 are two image fields 403a-b, which can be visually indicated to the user through the presence of icons or other visual interface elements. In some instances, the locations of image fields 403 are specified within the document 401, for example with a markup tag or other identifier within an XML document. In other instances, the document manipulation engine 321 (FIG. 3) recognizes the image fields 403 within the document 401 based on: detecting quadrilateral frames (e.g., squares or rectangles) meeting a size threshold, detecting keywords or objects in a region of the document (e.g., "photo" or a camera image), input from the user specifying the location and/or size of the image fields 403 via the user interface 365, and/or other possible information sources. The document manipulation engine 321 can perform the detection of the image fields 403 using the Open Source Computer Vision (OpenCV) library, such as included as part of the "Fill & Sign" feature used in Adobe® Acrobat® available from Adobe Systems, Inc. of San Jose, Calif., Optical Character Recognition (OCR), and/or other technologies. In some implementations, the document manipulation engine 321 further permits a user to adjust the location and/or size of existing image fields 403 within the document 401.

Figure 5:
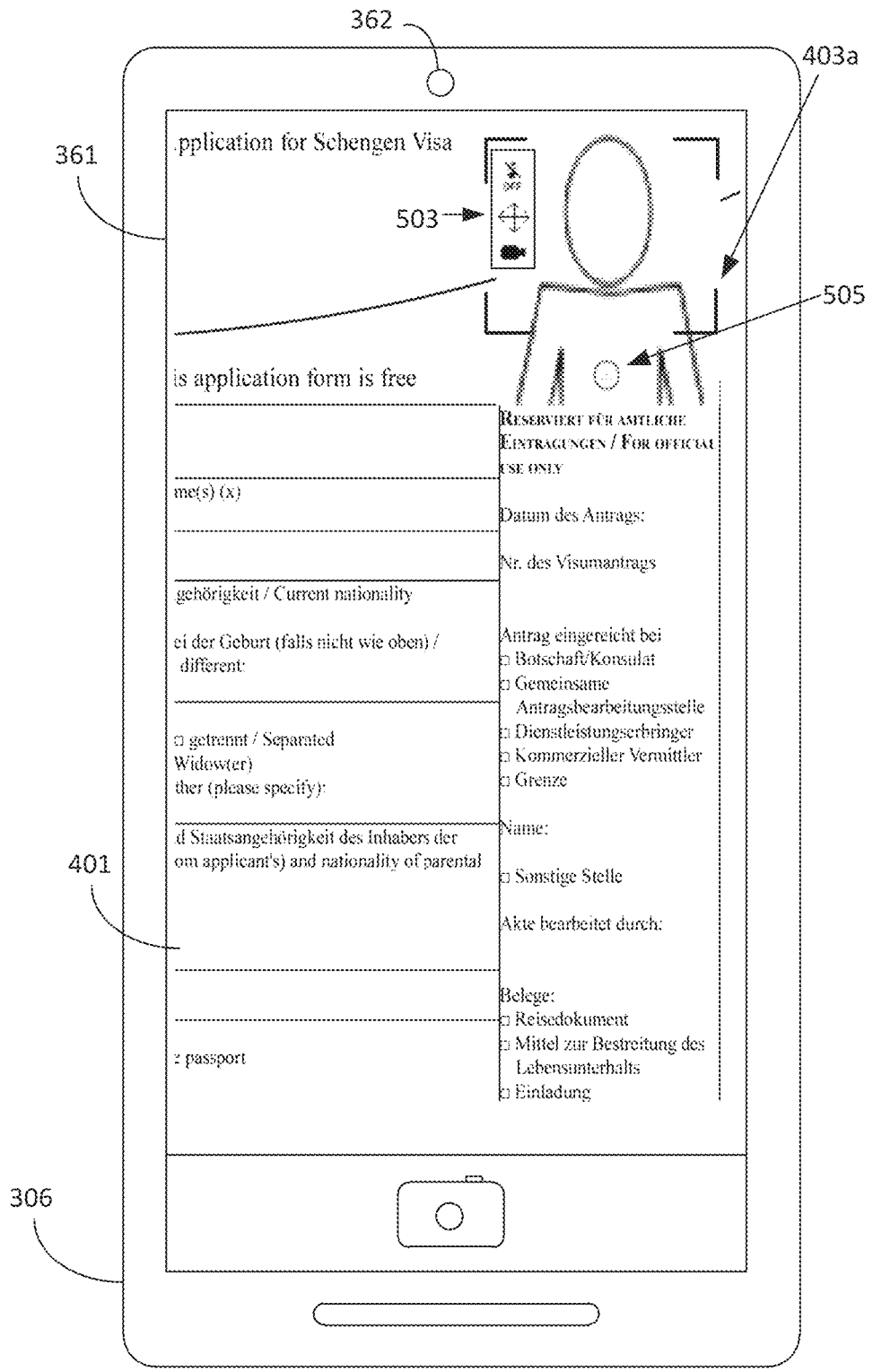

As shown in FIG. 4, the user has selected the image field 403a using the touch-sensitive display 361, but other types of input for selecting an image field are also possible, such as using a button, keyboard, mouse, or other type of input device. Once the image field 403a is selected, as shown in FIG. 5, the client device 306 begins displaying input received from the camera 362 within the image field 403a, while the image field 403a is presented within the context of the document 401. Each of the image fields 403a-b may also be referred to as a "live frame" and/or a "camera canvas." Input from the camera 362 can be displayed within the document 401 based on various camera Application Programming Interfaces (APIs) offered by the client device 306 that are accessible by the client application 363. For example, this functionality is offered in the API for the Android™ operating system using SurfaceView to provide a live frame within a specified region, such as the image field 403a. In some implementations, the live input can continue to be displayed while adjustments are made to the size and/or location of the image fields 403, as well as while adjustments are made to the settings for the live input itself (e.g. scaling). The view of the document presented on the display 361 in FIG. 5 is scaled (i.e., "zoomed") for an enlarged view of the document surrounding the image field 403a. The scaling can occur automatically as a result of the user selecting an image field or as a result of the user providing input that specifies enlarging the view of this region of the document 401, such as via a gesture interaction with the touch-sensitive display 361.

Figure 6:
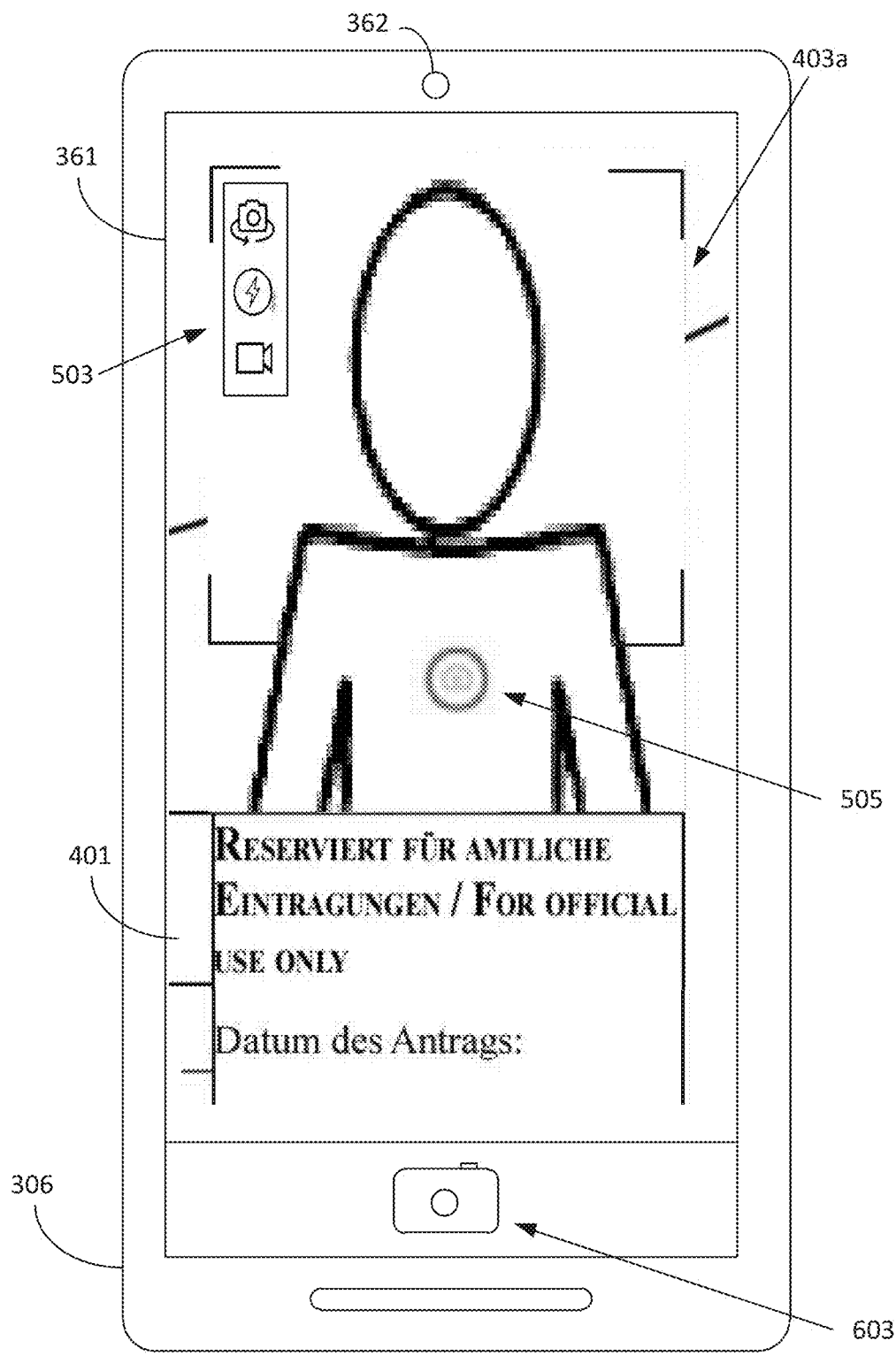

With the live input from the camera 362 presented in the image field 403a of the document 401, a user can evaluate how an image will look when captured within the document 401 and can use various controls 503 to adjust the settings of the live input used for capturing the image as needed to optimize the appearance. For example, the controls 503 can include options for the user to adjust: the scaling of the live input/image, the dimensions/shape of the live input/image, which camera is used (e.g., front or rear), whether one or more still images or videos are captured, whether audio is captured, whether flash or supplementary lighting is used, and/or other possible options as can be appreciated. Capturing more than one still image for an image field (e.g., capturing a sequence of two images) may be referred to as a "batch mode" capture. For example, a user may choose to capture both a sequence of two images, a front-view image of their face and a profile-view image of their face, within the image field 403a. When later viewed, the document 401 may then iterate through displaying the sequence of images in the image field 403a, whereby the image displayed may change on a rotating basis in response to user input, elapsed time, etc. As shown in FIG. 6, the user may again enlarge the view of the region of the document 401 where the image is to be captured, for example to make a closer inspection of the live input to be captured from the camera 362.

Figure 7:
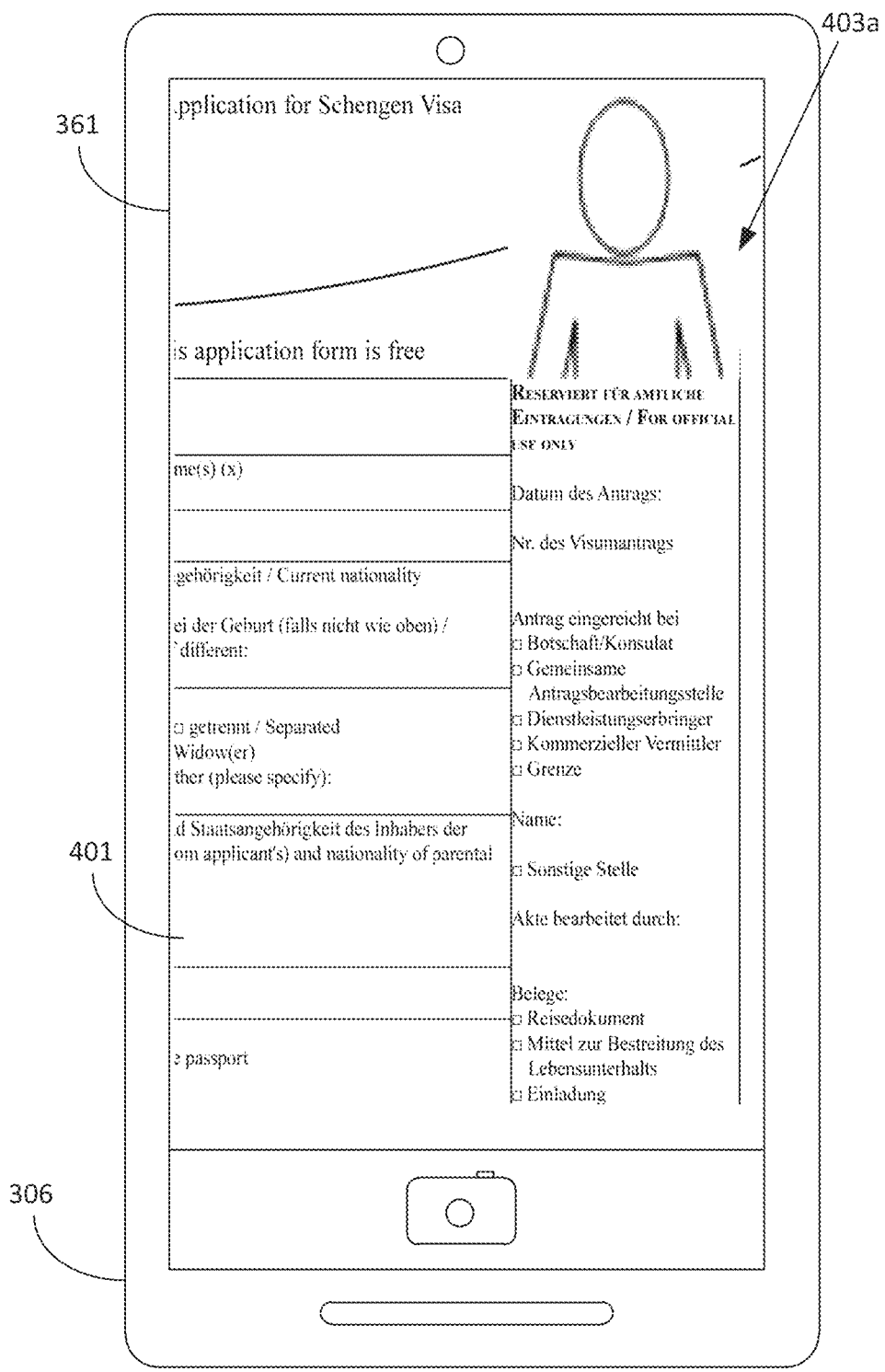

Once the user is satisfied with the appearance of the live input shown in the image field 403a within the context of the document 401 and has selected any desired options via the controls 503, the user can provide input to the client device 306, such as selecting the camera icon 505, that captures the image within the document 401. As noted previously, references herein made to capturing "an image" may include capturing one or more still images or videos, all of which include "an image." In some implementations, the user may start/stop the image capture using tactile buttons, such as the tactile button 603, selecting elsewhere within the image field 403a, a keyboard, a mouse, and/or other input sources instead of or in addition to the camera icon 505. Thereafter, the image captured from the live input from the camera 362 (the "captured image") is stored as a component part of the document 401. As shown in FIG. 7, subsequent viewings of the document 401 on computing devices, such as the client device 306, will present the document with the captured image shown in the image field 403a. In addition, the document 401, the captured image, and the various interactions undertaken to capture the image can be stored in the data store 312 and/or in the client device 306.

Figure 8:
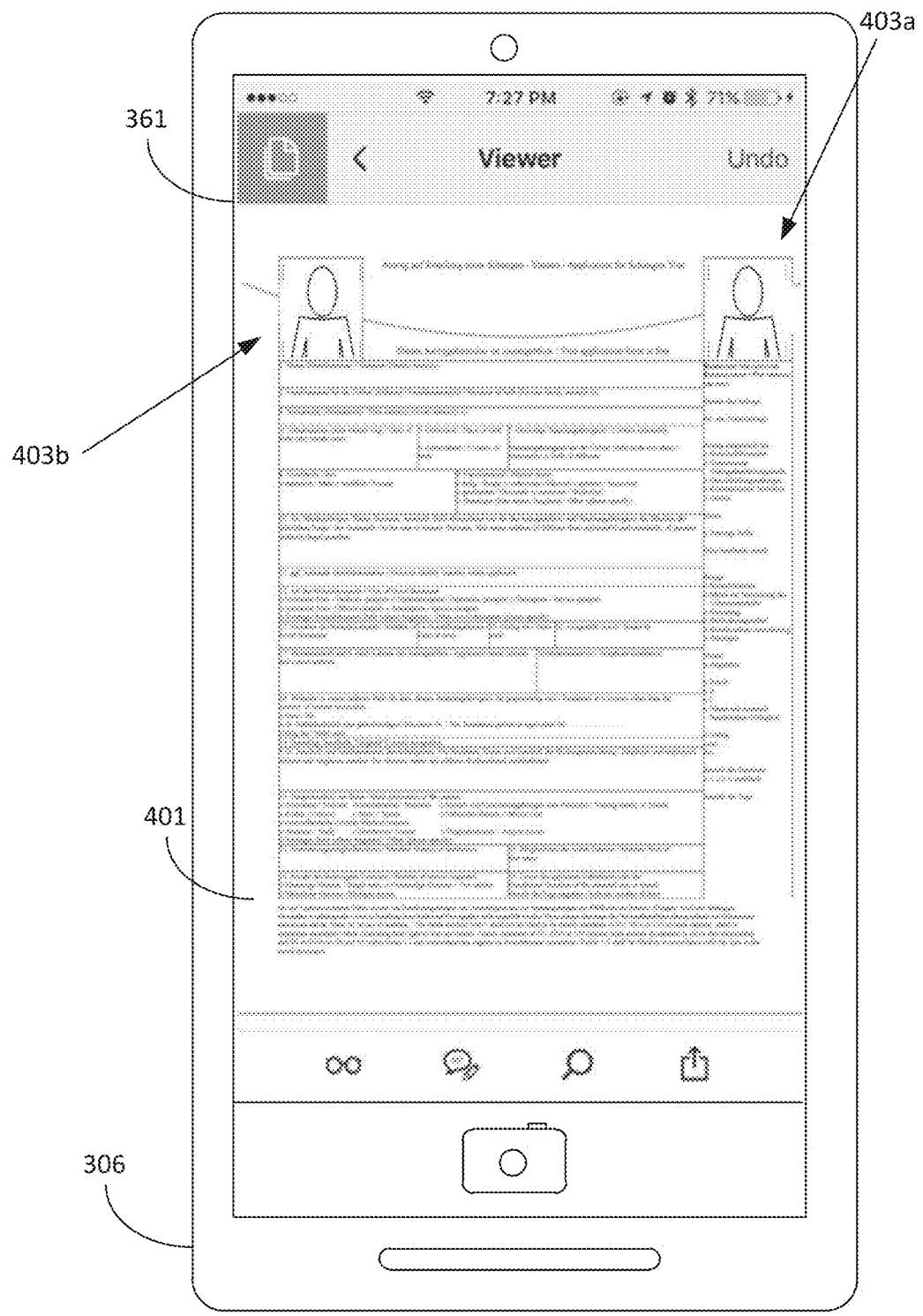

In some instances, a user interface is provided by the client device 306 with which a user may specify that a captured image should be used in multiple locations in a document, such as the document 401. For example, multiple image fields might be detected within a document that should each receive an image with dimensions 2 in.×2 in. Thus, when a user utilizes the techniques disclosed herein for capturing an image satisfactory for one of these image fields, the user can specify one or more other image fields within the same document or within other documents in which the same captured image can be inserted. As shown in the example of FIG. 8, the user has specified that the same image captured for image field 403a should also be used in image field 403b of the document 401. In some implementations, the user can specify a rule that for any document(s) detected to have image fields with dimensions that match the size of the captured image, the captured image should be inserted in those image fields. As another example, the document with which the user is interacting could be an electronic book for children in which a character's face used throughout the book can be replaced with the face of a child. Thus, a single captured image of the child's face can be replicated into many image fields for the character placed in different locations throughout the book.

Figure 9:
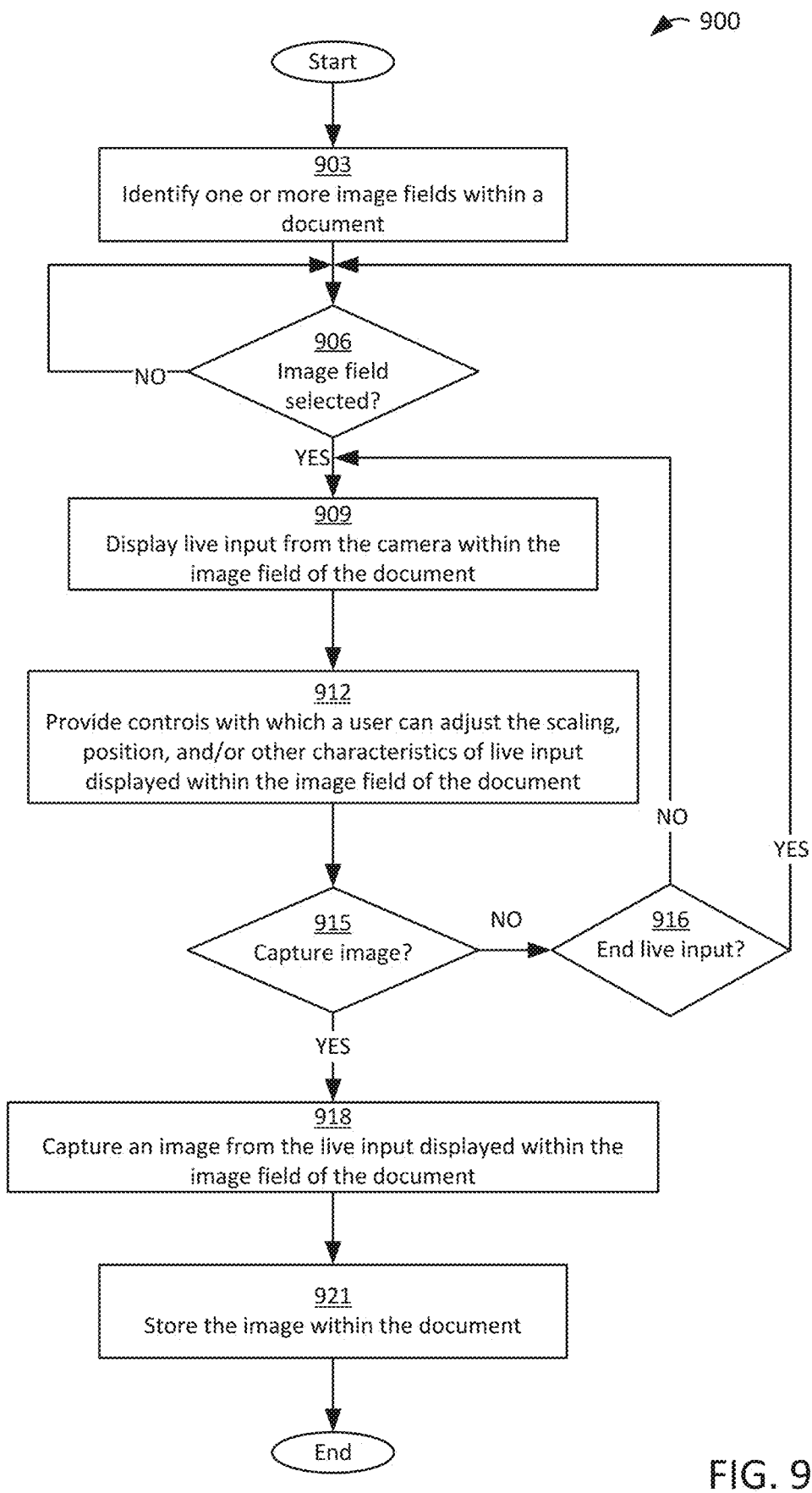
FIG. 9 is a flowchart illustrating one example of functionality implemented as portions of a method executed in a computing environment in the networked environment of FIG. 3 according to various embodiments of the present disclosure.

Moving on to FIG. 9, shown is a flowchart that provides one example of the operations for a method 900 that may be implemented in processor-based devices of the computing environment 303 (FIG. 3) and/or client device 306 (FIG. 3) according to various embodiments. It is understood that the flowchart of FIG. 9 provides merely an example of the many different types of functional arrangements that may be employed to implement the operations of the method 900 as described herein. The operations depicted in the flowchart of FIG. 9 may be initiated once the client device 306 selects a document to be modified.

Beginning with block 903, the method 900 identifies one or more image fields present within the document. In some instances, the locations of image fields are specified within the document, for example with a markup tag or other identifier within an XML document. In other instances, the method 900 recognizes the image fields within a document based on detecting "frames" of quadrilaterals or other shapes within the document meeting a size threshold, detecting keywords or objects in a region of the document (e.g., "photo" or a camera image in the region), input from the user via the user interface specifying a desired location of one or more image fields within the document, and/or other possible information sources. The image fields can be detected using the OpenCV library, such as included as part of the "Fill & Sign" feature used in Adobe® Acrobat® available from Adobe Systems, Inc. of San Jose, Calif., using OCR, and/or using other technologies.

Next, in block 906, the method 900 determines whether input was received from the user of the client device 306 selecting an image field. If not, execution of the method 900 returns to block 906. Alternatively, if an image field was selected, in block 909 the method 900 begins displaying, within the context of the document, live input from the camera 362 (FIG. 3) within the selected image field, where the camera is accessible by the client device 306. Input from the camera 362 can be displayed within the document based on various camera APIs offered by the client device 306. With the live frame presented in the image field of the document, a user can evaluate how an image will look when captured within the document.

Then, in block 912, the method 900 provides various controls to adjust the settings for capturing the image as needed to optimize the appearance. For example, the controls can include options for the user to adjust: the scaling of the image, the position of the image, the dimensions/shape of the image, which camera is used (e.g., front or rear), whether one or more still images or videos are captured, whether audio is captured, whether flash or supplementary lighting is used, and/or other possible options as can be appreciated. Subsequently, in block 915, the method 900 determines whether input has been received via a user interface indicating that the image should be captured (e.g., touching the camera icon, pressing a tactile button). If no input is received to capture the image, then in block 916, the method 900 determines if input has been received specifying that the image capture operations (i.e., the live input displayed in the selected image field) should end, such as by the user deselecting the image field by touching a portion of the display in a part of the document outside of the selected image field. If the image capture operations should not end, execution of the method 900 returns to block 909. Alternatively, if input is received indicating the image capture operations should end, execution of the method 900 returns to block 906 where display of the live input from the camera within the image field ceases and another image field can be selected.

Returning to the discussion of block 915, if input was received indicating that the user wishes to capture an image (e.g., selecting the camera icon), then in block 918 the image present in the live frame is captured within the document. As noted previously, references herein made to capturing "an image" may include capturing one or more still images or videos, all of which include "an image." Thereafter, in block 921, the captured image is stored as a component part of the document such that subsequent viewings of the document on computing devices will present the document with the captured image shown in the image field and possibly other image fields within the document as directed by the user. In addition, the document, the captured image, and the various interactions undertaken to capture the image can be stored in the data store 312 (FIG. 3) and/or in the client device 306. Thereafter, this portion of the execution of the method 900 ends as shown.

Figure 10:
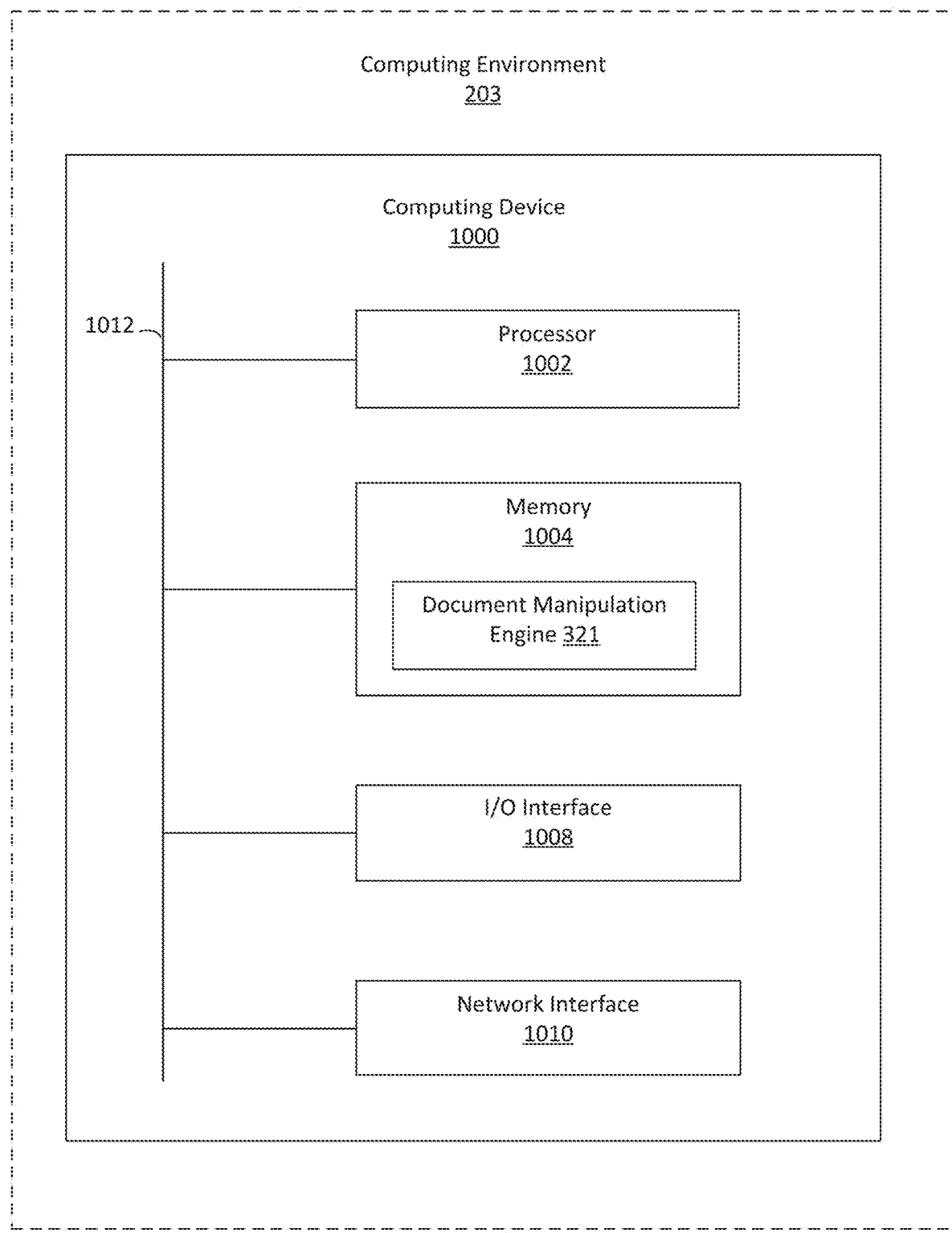
FIG. 10 is a schematic block diagram that provides one example illustration of a computing environment employed in the networked environment of FIG. 3 according to various embodiments of the present disclosure.

With reference to FIG. 10, shown is a schematic block diagram of the computing environment 303 according to an embodiment of the present disclosure. The computing environment 303 includes one or more computing devices 1000. Each computing device 1000 includes at least one processor circuit, for example, having a processor 1002, a memory 1004, an I/O interface 1008, and a network interface 1010, all of which are coupled to a local interface 1012. To this end, each computing device 1000 may comprise, for example, at least one server computer or like device. The I/O interface 1008 can interface with various devices, both locally attached and remote, for receiving and transmitting data, such as displays (including touch-sensitive displays), cameras, microphones, keyboards, mice, etc. The local interface 1012 may comprise, for example, a data bus with an accompanying address/control bus or other bus structure as can be appreciated.

Stored in the memory 1004 are both data and several components that are executable by the processor 1002. In particular, stored in the memory 1004 and executable by the processor 1002 is the document manipulation engine 321, and potentially other applications. Also stored in the memory 1004 may be a data store and other data. In addition, an operating system may be stored in the memory 1004 and executable by the processor 1002.

It is understood that there may be other applications that are stored in the memory 1004 and are executable by the processor 1002 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1004 and are executable by the processor 1002. In this respect, the term "executable" means a program file that is in a form that can ultimately be run by the processor 1002. Examples of executable programs may be, for example, a compiled program that can be translated into machine code in a format that can be loaded into a random access portion of the memory 1004 and run by the processor 1002, source code that may be expressed in proper format such as object code that is capable of being loaded into a random access portion of the memory 1004 and executed by the processor 1002, or source code that may be interpreted by another executable program to generate instructions in a random access portion of the memory 1004 to be executed by the processor 1002, etc. An executable program may be stored in any portion or component of the memory 1004 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 1004 is defined herein as including both volatile and nonvolatile memory and data storage components. Volatile components are those that do not retain data values upon loss of power. Nonvolatile components are those that retain data upon a loss of power. Thus, the memory 1004 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1002 may represent multiple processors 1002 and/or multiple processor cores and the memory 1004 may represent multiple memories 1004 that operate in parallel processing circuits, respectively. In such a case, the local interface 1012 may be an appropriate network that facilitates communication between any two of the multiple processors 1002, between any processor 1002 and any of the memories 1004, or between any two of the memories 1004, etc. The local interface 1012 may comprise additional systems designed to coordinate this communication, including, for example, performing load balancing. The processor 1002 may be of electrical or of some other available construction.

Although the document manipulation engine 321 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 9 shows the functionality and operation of an implementation of portions of the method 900. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1002 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document manipulation engine 321, that comprises software or code can be embodied in any non-transitory computer-readable medium for use by or in connection with an instruction execution system such as, for example, a processor 1002 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the document manipulation engine 321, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for capturing an image within a context of a document, the method comprising:
    identifying an image field within the document displayed in a graphical user interface (GUI) of a computing device, the image field operable to display live image input received from a camera accessible by the computing device, wherein the document comprises a portable document format, an extensible markup language format, or a word processing format;
    in response to receiving a first input from a user selecting the image field of the document, displaying, within the GUI of the computing device, the live image input from the camera within the image field of the document in a context of other portions of the document displayed outside of the image field;
    displaying, within the GUI of the computing device, controls with which the user can adjust scaling of the live image input from the camera displayed within the document; and
    in response to receiving a second input from the user, capturing by the camera and storing, within a memory of the computing device, the image from the live image input displayed within the image field of the document, wherein the image is stored as a component part of the document.

2. The method of claim 1, further comprising displaying, in the GUI of the computing device, the document including displaying the captured image in the image field of the document, the document stored as a file that includes the image.

3. The method of claim 1, wherein the controls further allow the user to perform at least one of the following: adjust lighting used, specify whether video or at least one still image should be captured, select a different camera, or adjust a size of the image field of the document.

4. The method of claim 1, wherein the document further comprises text strings, displaying the image field of the document in the context of other portions of the document comprises displaying the image field of the document among the text strings.

5. The method of claim 1, further comprising, in response to receiving additional input from the user deselecting the image field of the document, ceasing display of the live image input from the camera within the image field of the document.

6. The method of claim 1, wherein the document comprises a plurality of image fields that are selectable, the computing device receiving additional input from the user specifying ones of the plurality of image fields of the document for which the image should be inserted.

7. The method of claim 1, wherein said identifying the image field of the document comprises detecting a quadrilateral frame within the document that meets a size threshold.

8. The method of claim 1, wherein the image that is captured comprises a sequence of images, the computing device iterating through displaying the sequence of images in the image field of the document when the document is displayed.

9. The method of claim 1, wherein the computing device is a desktop computer attached to the camera, and the first and second inputs are received via a keyboard or mouse.

10. A non-transitory computer-readable medium embodying a program for capturing an image within a context of a document, the program executable in a computing device, comprising:
    code that identifies an image field within the document displayed in a user interface of a computing device, the image field identified based on detecting a quadrilateral frame that meets a size threshold, the image field operable to display live image input received from a camera accessible by the computing device;
    code that inserts one or more additional image fields within the document in response to a first input received from a user via the user interface of the computing device;
    code that in response to receiving a second input from the user selecting the image field of the document, displays, within the user interface of the computing device, the live image input from the camera within the image field of the document in a context of other portions of the document displayed outside of the image field;
    code that provides within the user interface of the computing device, controls with which the user can adjust settings for the live image input from the camera displayed within the document; and
    code that in response to receiving a third input from the user, captures by the camera and storing, within a memory of the computing device, the image from the live image input displayed within the image field of the document thereby avoiding editing of the image post-capture and adjusting the image in the image field post-capture, wherein the image is stored as a component part of the document.

11. The non-transitory computer-readable medium of claim 10, wherein the controls further allow the user to perform at least one of the following: adjust lighting used, specify whether video or at least one still image should be captured, select a different camera, or adjust a size of the image field of the document.

12. The non-transitory computer-readable medium of claim 10, wherein the code that displays the document includes displaying the captured image in the image field of the document, the document stored as a file that includes the image.

13. The non-transitory computer-readable medium of claim 10, wherein the image comprises at least one still image or a video.

14. The non-transitory computer-readable medium of claim 10, wherein the program further comprises code that in response to receiving additional input from the user deselecting the image field of the document, ceases display of the live image input from the camera within the image field of the document.

15. A computing device, comprising:
a network interface for communicating via a network accessible to the computing device;
a camera accessible to the computing device via an I/O interface;
a memory for storing an application, wherein the application comprises computer-implemented instructions for capturing an image within a context of a document; and
a processor for executing the computer-implemented instructions of the application and thereby causing the computing device to:
identify an image field within the document displayed in a user interface of the computing device, the image field operable to display live image input received from the camera accessible to the computing device, wherein the document comprises a portable document format, an extensible markup language format, or a word processing format;
in response to receiving a first input from a user selecting the image field of the document, display, within the user interface of the computing device, the live image input from the camera within the image field of the document in a context of other portions of the document displayed outside of the image field;
display, within the user interface of the computing device, controls with which the user can adjust settings for the live image input from the camera displayed within the document; and
in response to receiving a second input from the user, capture by the camera and storing, within the memory, the image from the live image input displayed within the image field of the document, wherein the image is stored as a component part of the document.

16. The computing device of claim 15, wherein the document comprises a plurality of image fields that are selectable, the computing device receiving additional input from the user specifying ones of the plurality of image fields of the document for which the image should be inserted.

17. The computing device of claim 15, wherein the application further causes the computing device to display the document, including displaying the captured image in the image field of the document, the document stored as a file that includes the image.

18. The computing device of claim 15, wherein the image that is captured comprises a sequence of images, the computing device iterating through displaying the sequence of images in the image field of the document when the document is displayed.

19. The computing device of claim 15, wherein said identifying the image field of the document comprises detecting a quadrilateral frame within the document that meets a size threshold.

20. The computing device of claim 15, wherein the computing device is a mobile device, and the first and second inputs are received via a touch-sensitive display.

* * * * *